June 29, 1937.   M. GOTTLIEB ET AL   2,085,580
ILLUMINATING DEVICE
Filed June 4, 1935   2 Sheets-Sheet 1
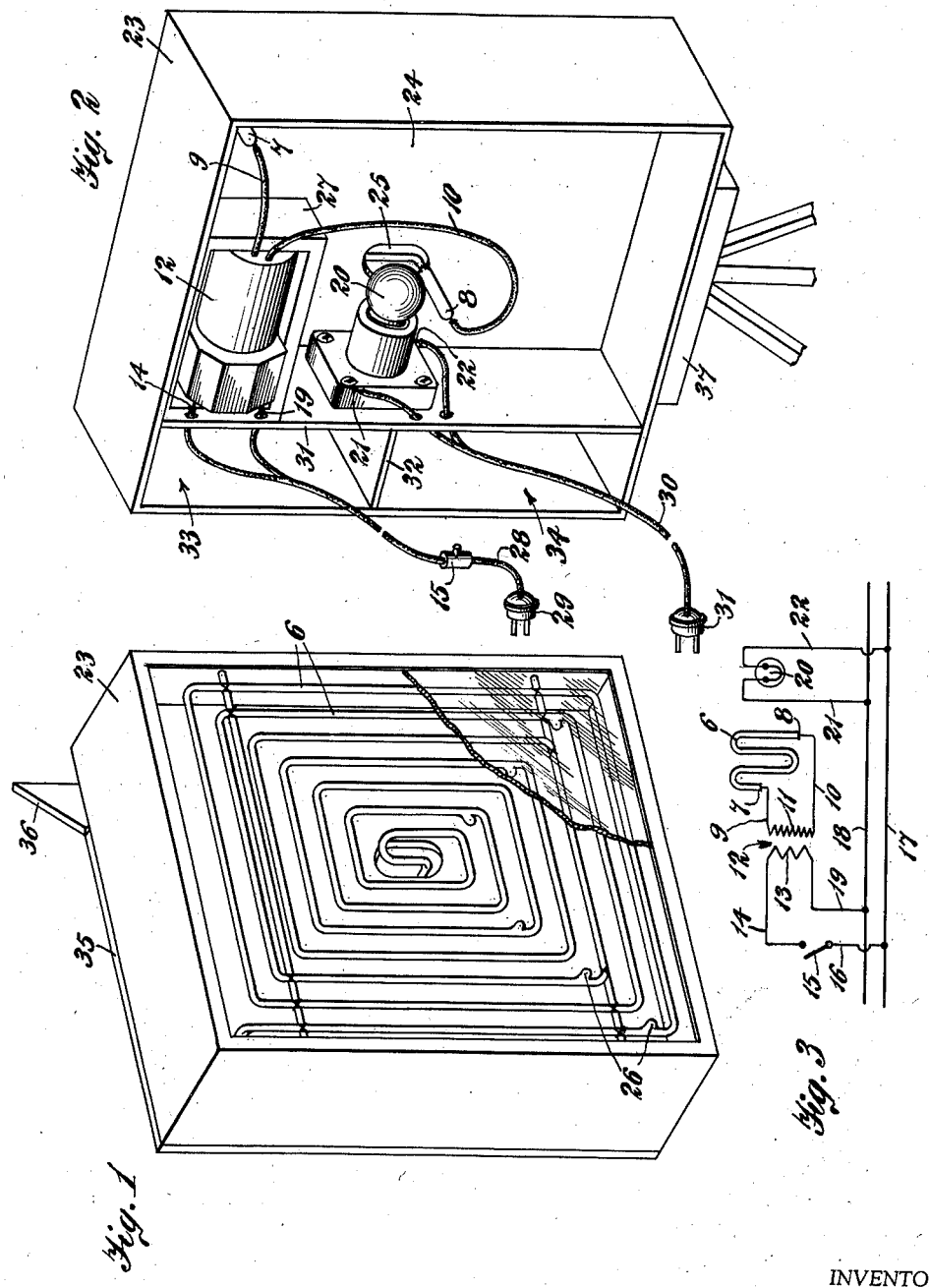
INVENTORS
MEYER GOTTLIEB AND
PHILIP GOTTLIEB
BY
Richards & Geier
ATTORNEY.

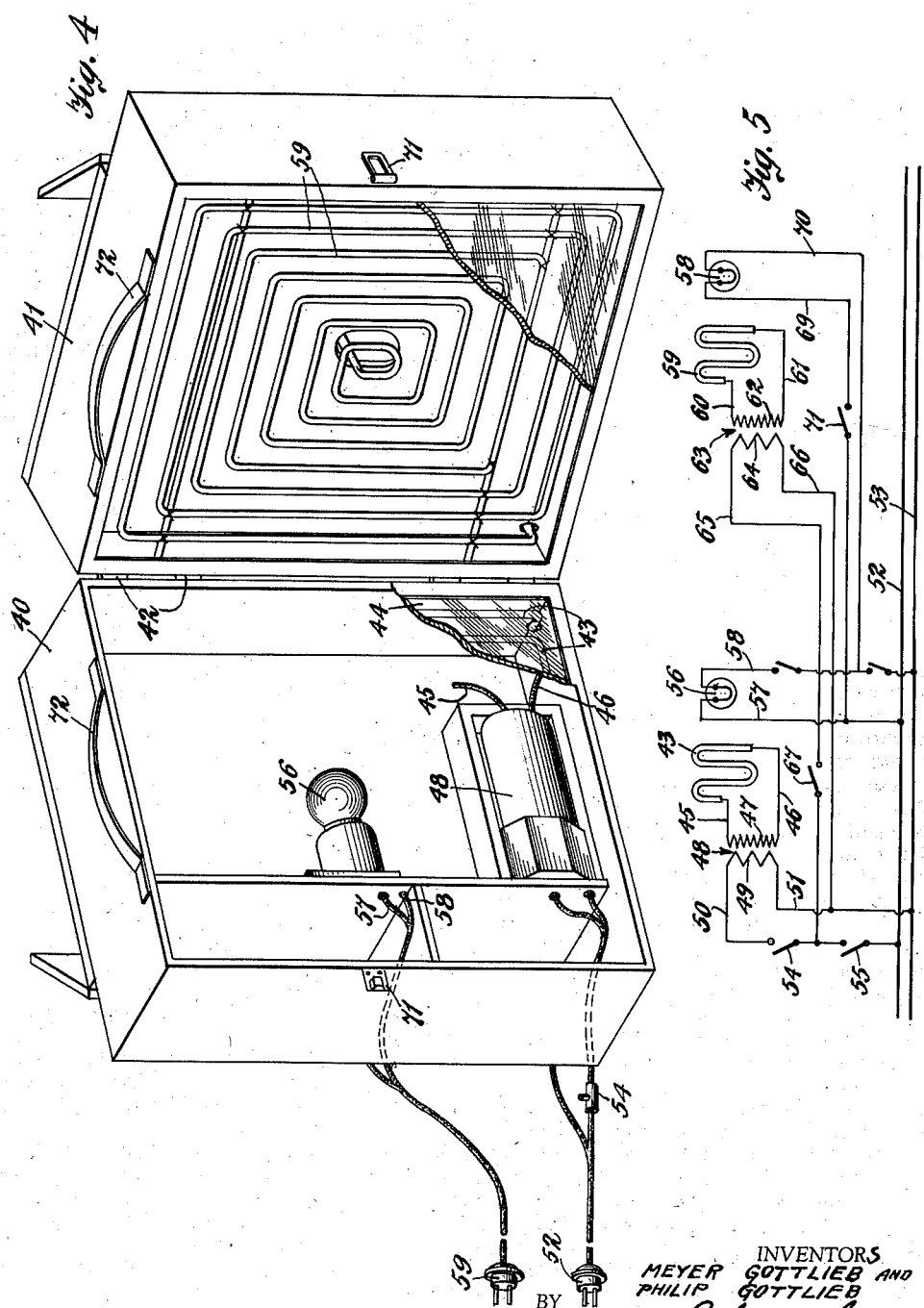

Patented June 29, 1937

2,085,580

UNITED STATES PATENT OFFICE 2,085,580

ILLUMINATING DEVICE

Meyer Gottlieb, Irvington, and Philip Gottlieb, Newark, N. J., assignors of one-third to Fred Alexander, Newark, N. J.

Application June 4, 1935, Serial No. 24,808

1 Claim. (Cl. 176—122)

This invention relates to improvements in illuminating devices and refers more particularly to a device adapted to be used in the photographic art for the purpose of producing actinic illumination.

An object of the present invention is the provision of a portable source of actinic light which may be used in photography for laboratory, studio and/or field work as well as for the purposes of location.

Another object is the provision of means capable of producing actinic light to be used in photography while printing photographic positives, said source of light being extremely economical in operation and being capable for diminishing to a large extent the time necessary for exposing a light sensitive layer.

A further object of the present invention is the provision of one single light emitting device which may be used for a great variety of purposes in the photographic art, namely, while photographing, exposing, printing, enlarging and copying, as well as for negative inspection, and retouching.

Still another object is to construct a device capable of producing actinic illumination without objectionable heat, consisting of rays of light which will penetrate through dark or thick portions of a negative without burning any light or thin portions, thereby enhancing the brilliancy and depth of the photographs.

Yet another object is the provision of a portable source of photographic light, any and all parts of which can be easily replaced or repaired, which requires no installation and which may be operated by alternating currents of various voltages.

The above and other objects of the present invention may be realized through the provision of a source of photographic light which contains one or more glass tubes filled with a pre-determined amount of argon gas and mercury vapor selected for the purpose of producing rays of light of certain pre-determined wave lengths. The voltage applied to the electrodes situated on both ends of said glass tube or tubes is supplied by a transformer, the primary winding of which may be fed by an electrical current of the usual voltage used in domestic installation. The device is further provided with a negative inspection light adapted to be used for photographic inspection purposes.

The invention will appear more clearly from the following detailed description when taken in connection with the accompanying drawings showing by way of example preferred embodiments of the inventive idea.

In the drawings:

Figure 1 is a perspective view of the device constructed in accordance with the principles of the present invention.

Figure 2 illustrates in perspective the back portion of the device with its cover removed.

Figure 3 is a diagram illustrating the various wiring connections of the device.

Figure 4 is a perspective view of a somewhat differently constructed device.

Figure 5 is a diagram illustrating the wiring connections of the device shown in Figure 4.

The source of actinic light shown in Figures 1, 2 and 3 of the drawings comprises a number of glass tubes 6 which are preferably bent in the form of a spiral or the like to form a grid.

As shown diagrammatically in Figure 3, electrodes 7 and 8 are situated at the two ends of the glass tubes 6 and are connected by wires 9 and 10 respectively with the secondary winding 11 of the transformer 12.

The primary winding 13 of the transformer 12 is connected by a wire 14 with a switch 15. The wire 16, one end of which is connected to the switch 15, may be connected with the electrical main line 17. The wire 19 connects the opposite end of the primary winding 13 with the second main line 18.

The negative inspection lamp 20 is attached to wires 21 and 22 which may be connected to the mains 17 and 18.

As shown in Figure 1, the glass tubes 6 are situated in the front portion of the container 23 and are bent in the form of a rectangular spiral. A partition wall 24 (Figure 2) separates the front portion of the container 23 from the back portion wherein the transformer 12 and the negative inspection lamp 20 are located. The partition wall 24 is provided with a central opening 25 which is used for transmitting the light rays emitted by the lamp 20, and through which passes one end of the spiral glass tubes 6 containing the electrode 8. The surface of the partition wall 24 adjacent and nearest to the glass tubes 6 and the adjacent surfaces of the side walls of the container 23 are reflective, so that substantially all the light emitted by the tubes 6 is projected through the open side of the container. The opposite end of the glass tubes 6 containing the electrode 7 is also situated in the rear portion of the container 23 and is passed through an opening formed in one of the corners of the partition wall 24.

As shown in Figure 1, the spiral glass tubes 6 are provided with suitable pockets 26 which contain mercury and which are used for the purpose of steadying the light emitted by the glass tubes 6. In operation, the pockets 26 which are intermediate the electrodes and are distributed over the grid, hold some of the mercury so that at the instant the switch 15 is closed mercury vapor is formed in every part of the grid intermediate the electrodes. This results in a uniform light immediately, without waiting until the operating voltage has been applied for a while across the electrodes, as in the various constructions proposed heretofore.

As shown in Figure 2, the transformer 12 may be supported in the rear portion of the container 23 by a separate wall 27 attached to the wall 24. The insulated wires 14 and 19 may be joined together to form a cord 28 connected with a plug 29. The wires 21 and 22 connected to the lamp 20 may be joined to form a cord 30 carrying a plug 31. The plugs 29 and 31 may be inserted into any suitable socket connected with a source of electrical energy of low voltage.

Partition walls 31 and 32 situated within the container 23 form two compartments 33 and 34 within this container. The compartment 33 contains the plug 29 and the cord 28 while the apparatus is being transported. The compartment 34 contains the cord 30 and the plug 31.

As shown in Figure 1, the back portion of the container 23 is covered by a wall 35 which is firmly attached to the side walls of the container and which is provided with a door 36 connected by hinges with the wall 35. The door 36 which covers the compartments 33 and 34 is closed while the apparatus is being transported and is opened when it is necessary to withdraw the plug 29 or the plug 31 from their respective compartments.

The transformer 12 is used for changing the electrical current of low voltage to a high voltage of about 6,000 volts although obviously other high voltages may be employed. As shown in Figure 2, the container 23 may be placed upon a tripod 37 while the apparatus is being used.

The glass tubes 6 are filled with a mixture of mercury vapor and argon. It was found after many practical experiments that there is a certain definite amount of mercury and argon which will give the best possible results for glass tubes of a pre-determined size. If nine millimeter glass tubing is used and if the dimensions of the outer spiral are about seven and a half inches by ten inches, these glass tubes should be filled with about 4.74 grams of mercury and about 15 millimeters of argon. Obviously different amounts of mercury and argon should be used for tubes of different dimensions.

The apparatus shown in Figures 4 and 5 consists of two separate containers 40 and 41 which are inter-connected by hinges 42. The container 40 and the container 41 are two separate units which may be placed side by side and operated simultaneously. The container 40 serves as a casing for the spiral glass tubes 43 which are covered by a transparent layer 44 consisting of diffusing glass or the like. The spiral glass tubes 43 are connected by wires 45 and 46 with the secondary winding 47 of a transformer 48. The primary winding 49 of the transformer is connected with the wires 50 and 51 leading to a plug 52 which may be connected with any suitable main lines 52 and 53. The wire 50 is connected with two switches 54 and 55. The negative inspection light 56 situated substantially in the middle of the container 40 is connected by wires 57 and 58 to a plug 59.

The second source of actinic light carried by the container 41 comprises the spiral glass tubes 59 which are joined by wires 60 and 61 to the secondary winding 62 of a transformer 63. The primary winding 64 of the transformer is joined by wires 65 and 66 with the wires 50 and 51 respectively. A switch 67 may be interposed between the wires 65 and 50.

The negative inspection lamp 68 is connected by wires 69 and 70 to the wires 57 and 58 respectively, a switch 71 being interposed between the wire 57 and the wire 69.

When the device illustrated in Figures 4 and 5 is being transported, the two containers 40 and 41 are securely closed by the lock 71. Handles 72 may be conveniently used for transporting the apparatus.

When one of the plugs connected to the spiral glass tubes is joined to a source of electrical energy, the high voltage developed at the end of the glass tubes filled with mercury vapor and argon will cause a radiation of the tubes. The light emitted by the glass tubes is light blue in color and was found to have an excellent effect upon photographic light-sensitive layers. No objectionable amount of heat is emitted while the apparatus is being used. This blue light emitted by the apparatus may be used when photographing an object to illuminate the same while the object is being photographed. The same light may be used during the printing, and practical experiments have shown that through the use of the described light, the time required for exposures is sustantially diminished.

The current flowing in the described apparatus is extremely small, for instance, in the case of a 6,000 volt transformer, the current is about 30 milliamperes.

What is claimed is:

An illuminating device comprising glass tubing bent to form a grid and provided with electrodes, said tubing containing mercury or a like liquid characterized by the fact that it changes to a luminous vapor when an electrical potential is impressed across said electrodes, said tubing being formed to provide pockets intermediate and independent of said electrodes and distributed over the grid, said pockets being connected to said tubing through substantially unrestricted openings and each pocket being disposed to hold some of said mercury.

MEYER GOTTLIEB.
PHILIP GOTTLIEB.